(12) United States Patent
Gruss et al.

(10) Patent No.: US 8,807,642 B2
(45) Date of Patent: Aug. 19, 2014

(54) MECHANISM COMPONENTS INTEGRATED INTO STRUCTURAL SUNROOF FRAMEWORK

(71) Applicant: Tesla Motors, Inc., Palo Alto, CA (US)

(72) Inventors: Matthew Paul Gruss, San Francisco, CA (US); Marcus Christensen, Davisburg, MI (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/629,169

(22) Filed: Sep. 27, 2012

(65) Prior Publication Data
US 2013/0082488 A1 Apr. 4, 2013

Related U.S. Application Data

(60) Provisional application No. 61/540,648, filed on Sep. 29, 2011.

(51) Int. Cl.
*B60J 7/053* (2006.01)
*B60J 7/047* (2006.01)
*B60J 7/02* (2006.01)
*B60J 7/043* (2006.01)

(52) U.S. Cl.
CPC . *B60J 7/043* (2013.01); *B60J 7/022* (2013.01)
USPC .......................... 296/222; 296/216.05; 296/223

(58) Field of Classification Search
USPC ............................................. 296/216.01–224
See application file for complete search history.

(56) References Cited

U.S. PATENT DOCUMENTS 4,602,815 A * 7/1986 Boots et al. ................... 296/222
5,795,016 A * 8/1998 Otake ............................ 296/223

* cited by examiner

*Primary Examiner* — Dennis H Pedder
(74) *Attorney, Agent, or Firm* — J. Richard Soderberg

(57) ABSTRACT

Continuous cross sectional profile guide tracks in an outer sliding sunroof/moonroof are provided where both the front and rear mechanism or mechanism links travel fore/aft in the same channels as each other and have fore/aft travel that is limited only by vehicle architecture. The guide track channel is partly or entirely outside/outboard of the primary water/wind sealing system of the sunroof.

14 Claims, 9 Drawing Sheets

MECHANISM COMPONENTS INTEGRATED INTO STRUCTURAL SUNROOF FRAMEWORK

CROSS REFERENCE TO RELATED APPLICATIONS

This Application claims the benefit of U.S. Provisional Application 61/540,648 filed on Sep. 29, 2011 the contents of which are expressly incorporated by reference thereto in its entirety for all purposes.

This application is related to the following U.S. applications, all filed on the same date as the present application: U.S. patent application Ser. No. 13/628,980 which claims benefit of U.S. Provisional Application 61/540,557 titled "In-Line Outer Sliding Panorama Sunroof Tracks" and filed on Sep. 29, 2011; U.S. patent application Ser. No. 13/629,238 which claims benefit of U.S. Provisional Application 61/540,758 titled "Sunroof Mechanism Linkage with Continuous One Part Guide Track" and filed on Sep. 29, 2011; U.S. patent application Ser. No. 13/629,248 which claims benefit of U.S. Provisional Application 61/540,930 titled "Sunroof Utilizing Two Independent Motors" and filed on Sep. 29, 2011; and U.S. patent application Ser. No. 13/629,392 which claims benefit of U.S. Provisional Application 61/541,021 titled "Sunroof Positioning and Timing Elements" and filed on Sep. 29, 2011, the contents of all these non-provisional and provisional applications are all hereby expressly incorporated by reference thereto in their entireties for all purposes.

FIELD OF THE INVENTION

The present invention relates generally to passenger compartments, and more specifically, but not exclusively, to a moveable roof track assembly of a passenger vehicle.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Outer sliding panels (also commonly referred to as sunroofs, moonroofs, panorama roofs, panoramic roofs and other trade names herein referred to generically as a sunroof) are sunroofs where a movable panel (made of glass, sheet metal, metal reinforcements, polycarbonate or a combination of these or similar materials), from its closed position, lifts or tilts and then moves into a position above a fixed panel where it effectively provides an opening in the roof to the outside air. This can give occupants the feel of openness towards the sky similar to a retracted convertible top. The larger the open air opening ("hands through opening") and the larger the transparent opening when the moving panel is closed ("day light opening") the more value is gained regarding this feeling.

Typical outer sliding sunroof designs use two sets of guide tracks with independent mechanism guide channels in different cross-car positions (Y) or a single guide track but through machining operations the mechanism guide channels are effectively independent of one another concerning their positions in the cross-car (Y) direction. The forward guide track channel and mechanism components are normally contained inside of the wind/water sealing system. As such, the fore/aft travel of the moving panel is restricted to be within the perimeter of that sealing system.

Many sunroof systems use fixed cam blocks that are external to the sliding mechanism components to control the up/down motion of the moving panel. These cam blocks contain slots that pieces of the mechanism slide through during their fore/aft and or up/down motion. The shape of these slots defines the up/down motion of the moving panel. The cam blocks are typically screwed or riveted to the guide tracks or other structural elements of the sunroof framework. This assembly architecture increases complexity/part count, increases an overall size of the sunroof assembly, is a source of noise, adds manufacturing complexity/steps; and requires more time and assembly attention to ensure proper alignment.

In sun roof systems, sometimes a sunroof housing is provided. These housings are normally a fixed static component to which tracks, cams, and operational/functional mechanisms are mounted. These housings are static and act as a skeleton onto which the active elements are mounted and/or attached.

What is needed is a system and method for improving sunroof implementations to reduce complexity and noise potential and improve reliability and manufacturability while concurrently maximizing an open air (sky) day light opening.

BRIEF SUMMARY OF THE INVENTION

Disclosed is a system and method for improving sunroof implementations to reduce complexity and noise potential and improve reliability and manufacturability while concurrently maximizing an open air (sky) day light opening.

The following summary of the invention is provided to facilitate an understanding of some of technical features related to sunroof implementations, and is not intended to be a full description of the present invention. A full appreciation of the various aspects of the invention can be gained by taking the entire specification, claims, drawings, and abstract as a whole. The present invention is applicable to other passenger compartments.

A frame assembly for a moveable panel system for a roof of a passenger compartment of a vehicle, including: a housing including a pair of lateral opposing generally vertical sidewalls and a generally horizontal base wall extending between the pair of sidewalls defining a passenger compartment opening; and a pair of track mounting regions defined at each sidewall, each the track mounting region mounting a track that includes a channel configured to accept one of a pair of lateral forward linkages of a moveable panel, each the channel guiding a particular one of the forward linkages as the moveable panel moves forward and aft over the base wall, with each channel including a forward opening; wherein a forward portion of each the sidewall defining an integrated cam slot configured to accept one of the forward linkages, each the integrated cam slot including a rear opening juxtaposed with one of the forward openings when the tracks are mounted to the pair of track mounting regions; wherein the cam slots define a lift/lower profile for the moveable panel as the moveable panel lifts and lowers with respect to the passenger compartment opening responsive to the forward linkages moving within the cam slots.

A moveable panel system for a roof of a passenger compartment of a vehicle, including: a left lateral track including a left outer guiding channel and a left inner guiding channel, the left outer guiding channel including a left forward opening; a right lateral track including a right outer guiding channel and a right inner guiding channel, the right outer guiding channel including a right forward opening; a moveable panel having a panel perimeter including a front edge, a back edge, a left edge, and a right edge; a left forward mechanical linkage coupled to a forward portion of the left edge and moveably engaged with the left outer guiding channel; a right forward mechanical linkage coupled to a forward portion of the right edge and moveably engaged with the right outer guiding channel; a left rearward mechanical linkage coupled to a rearward portion of the left edge behind the left forward mechanical linkage and moveably engaged with the left outer guiding channel; a right rearward mechanical linkage coupled to a rearward portion of the right edge behind the right forward mechanical linkage and moveably engaged with the right outer guiding channel; and a frame assembly disposed in the roof, the frame assembly including: a housing including: a left lateral generally vertical sidewall having a forward left portion defining an integrated left cam slot configured to accept the left forward mechanical linkage, the integrated left cam slot including a left rear opening; a right lateral generally vertical sidewall having a forward right portion defining an integrated right cam slot configured to accept the right forward mechanical linkage, the integrated right cam slot including a right rear opening; a generally horizontal base wall extending between the sidewalls and defining a passenger compartment opening having an opening perimeter smaller than the panel perimeter; a left track mounting region defined at the left sidewall mounting the left lateral track to the left sidewall while juxtaposing the left forward opening with the left rear opening; and a right track mounting region defined at the right sidewall mounting the right lateral track to the right sidewall while juxtaposing the right forward opening with the right rear opening; wherein the left outer guiding channel guides the left linkages as the moveable panel moves forward and aft over the base wall; wherein the right outer guiding channel guides the right linkages as the moveable panel moves forward and aft over the base wall; and wherein the cam slots define a lift/lower profile for the front edge of the moveable panel as the moveable panel lifts and lowers with respect to the passenger compartment opening responsive to the forward linkages moving within the cam slots.

A structure for a moveable panel system for a roof of a passenger compartment of a vehicle, including a support including a pair of lateral opposing generally vertical sidewalls and a generally horizontal base wall extending between the pair of sidewalls defining a passenger compartment opening; and a pair of track mounting regions defined at each sidewall, each the track mounting region mounting a track that includes a channel configured to accept one of a pair of lateral forward linkages of a moveable panel, each the channel guiding a particular one of the forward linkages as the moveable panel moves forward and aft over the base wall, with each channel including a forward opening; wherein the support includes a plurality of integrated surfaces formed to support a plurality of kinematic functions associated with installation and operation of the moveable panel.

The embodiments of the present invention described herein provide a continuous cross sectional profile guide tracks in an outer sliding sunroof where both the front and rear mechanism or mechanism links travel fore/aft in the same channels as each other and have fore/aft travel that is limited only by the vehicle architecture. This guide track channel is partly or entirely outside/outboard of the primary water/wind sealing system of the sunroof.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

The present invention includes integration of forward cam slots into forward portions of a moveable panel (e.g., a sunroof and the like) structure that, among other benefits: a) reduces the number of parts in the overall sunroof assembly; b) allows for a smaller overall size of the sunroof assembly; c) reduces the potential for noises caused by loose screws or rivets; d) reduces the number of manufacturing steps needed to assemble the sunroof system; and e) reduces the potential for misalignment of parts in the assembly which negatively affect the fit, form and function of the sunroof. Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method improving sunroof implementations to reduce complexity and noise potential and improve reliability and manufacturability while concurrently maximizing an open air (sky) day light opening. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

As noted in the background, some conventional sunroof installations include use of a sunroof housing that provides a mostly static skeleton (it may offer some structural function but the housing itself is a framework upon which the other elements are assembled. As compared to embodiments of the present invention which uses a framework including a "housing-less" structure, the reliability and manufacturability are improved while concurrently improving an open air (sky) day light opening. These embodiments include an active support that does not separate kinematic function and "non-functional" (referred to herein as static/structural function). Kinematic function pertains to active elements associated with moving, lowering/lifting, and positioning the moveable panel (e.g., the sunroof), among other functions. For example, conventional systems include a housing onto which cam structures are mounted. Some embodiments of the present invention integrate at least some of the cam structures into the structure.

Figure 1:
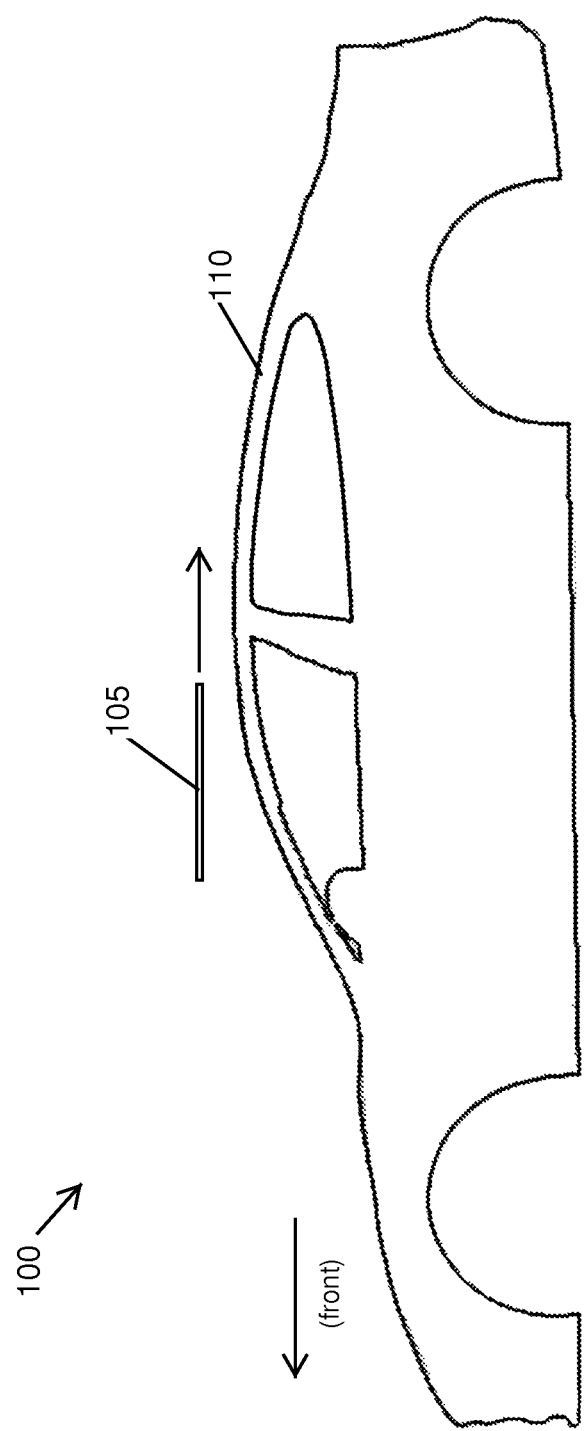
FIG. 1 illustrates a side profile of a vehicle passenger compartment outfitted with in-line outer sliding panorama sunroof tracks.

FIG. 1 illustrates a side profile of a vehicle passenger compartment 100 outfitted with a set of in-line outer sliding panorama sunroof tracks. A sunroof 105 installed in a roof portion 110 of compartment 100 moves fore and aft along the set of tracks. Sunroof 105 is shown schematically above roof portion 110 for ease in visualization but it is understood that it is moveably installed in roof portion 110 as shown and described elsewhere herein.

Figure 2:
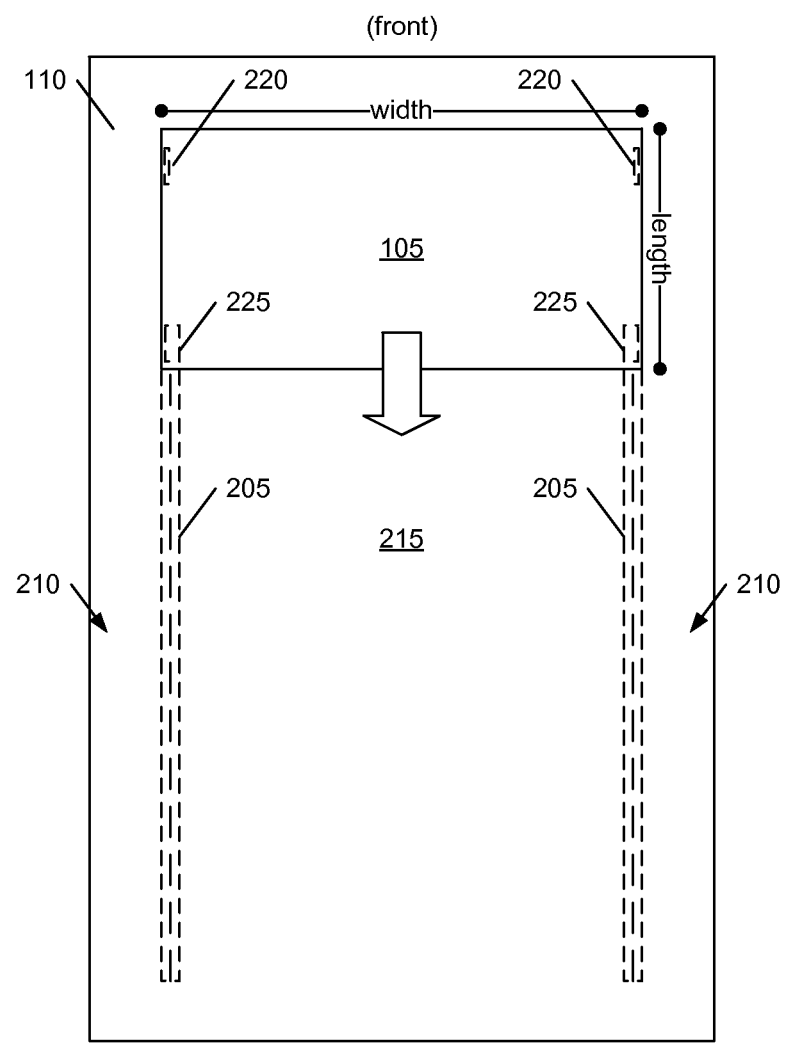
FIG. 2 illustrates a generic representation of a top view of the roof portion of the compartment illustrated in FIG. 1 with the sunroof in the closed mode.

FIG. 2 illustrates a generic schematic representation of a top view of roof portion 110 of compartment 100 illustrated in FIG. 1 with sunroof 105 in a closed mode. A sunroof track 205 is installed at lateral edges 210 of roof portion 110. Sunroof 105 is located above a forward seating area of compartment 100 and moves rearwardly over a region 215 of roof portion 110 when opened. Sunroof 105 provides an aerodynamic profile when closed, and therefore a rear edge of sunroof 105 is in-line with a front edge of region 215. To move rearwardly, sunroof 105 is required to rise up and out of this position when initiating the rearward opening motion to pass over region 215. Further, sunroof 105 drops down and into this position when finishing its closing action. Region 215 may be provided with a fixed moonroof or a solid panel over a rear seating or cargo compartment.

Track 205 is manufactured as a single continuous guiding assembly, such as for example, by an extrusion (e.g., metallic or plastic) process, a roll formation process, a machining process, or the like. Track 205 may be of any length and is installed as a parallel mirror complement to track 205 on an opposing lateral edge 210. The length of track 205 controls how far sunroof 105 may move (i.e., a fore/aft travel distance), which in turn influences a maximum length of sunroof 105. Sunroof 105 may be made longer the further that track 205 runs along lateral edge 210.

Each track 205 includes two parallel guide channels that run its entire length. Sunroof 105 is moveably coupled to these channels using linkage mechanisms that ride in these channels. Sunroof 105 includes a pair of forward linkages 220 (one for each track 205) and a pair of rearward linkages 225 (one for each track 205). In the preferred embodiment, forward linkage 220 and rearward linkage 225 for the same track 205 are disposed in the same physical channel, for example an outermost channel. Additionally, rearward linkage 225 is also disposed in an innermost channel. This enables rearward linkage 225 to independently interact with a lifting/lowering assembly (e.g., a cam or other structure) to lift the rearward edge of sunroof 105 when opening and to lower the rearward edge when closing.

The length of track 205 is affected by an architecture of compartment 100. In conventional systems, a sealing system for sunroof 105 limits the width/length as well as the fore/aft travel distance. In this implementation, the fore/aft travel distance of sunroof 105 is not limited by the sealing system (described later) but rather only limited by architectural demands (for example, a length of roof, a desired head room for the rear seat row(s), an inclusion of a hatchback frame, and a requirement to not continue the travel motion over the backlights or rear window, and the like).

Consequently sunroof 105 is able to achieve significantly larger hands through opening and day light opening sizes than one built with typical construction. Further, these embodiments greatly simplify assembly and manufacturability while allowing reductions in cost because fewer parts are required.

Figure 3:
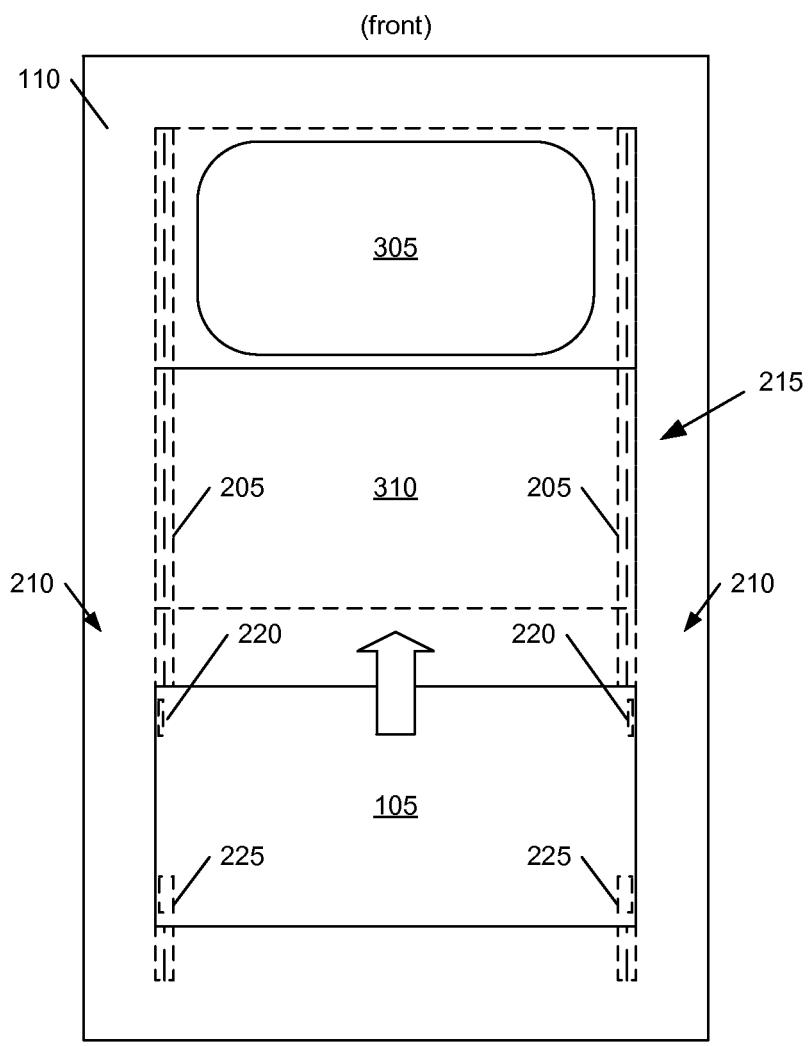
FIG. 3 illustrates the generic representation of FIG. 2 with the sunroof in the open mode.

FIG. 3 illustrates the generic representation of FIG. 2 with sunroof 105 in the open mode. When opened, sunroof 105 reveals a compartment opening 305 that had been previously covered and sealed against the environment. When track 205 is long enough, sunroof 105 may be moved far enough back to uncover enough of region 215 that an optional moonroof 310 in region 215 may be uncovered as well.

Figure 4:
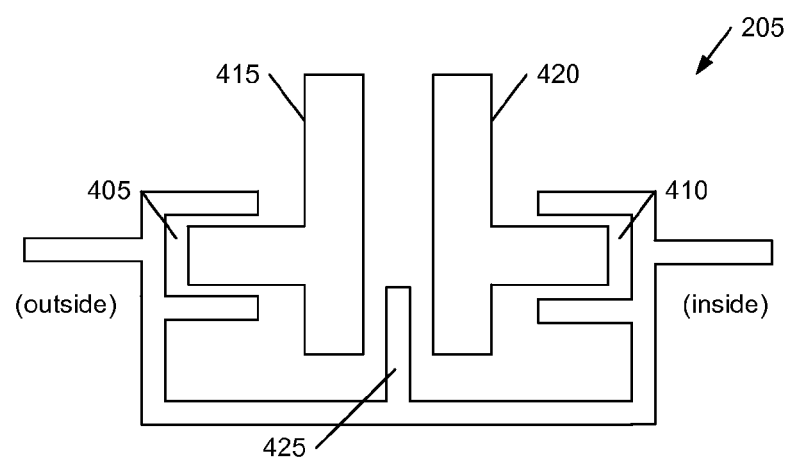
FIG. 4 illustrates a cross-sectional view of a sunroof track.

FIG. 4 illustrates a cross-sectional view of sunroof track 205 as looking from front-to-back of a left-hand-side track 205. Track 205 includes an outer continuous channel 405 and an inner continuous channel 410 rearward of a rear mechanism lifting/lowering cam. A representative outer channel engagement element 415 is duplicated in part of forward linkage 220 and in part of rearward linkage 225. A representative inner channel engagement element 420 is part of rearward linkage 225. A vertical guide rib 425 separates outer continuous channel 405 and inner continuous channel 410. Vertical guide rib 425 provides mechanical support and guidance for structures moving within the channels.

As discussed above, when sunroof 105 is opening, it must lift. This lifting is needed in order to provide clearance above region 215. In order for sunroof 105 to lift, it is actuated by lifting (or cam) elements to do so. These lifting elements are required to act upon both forward linkage 220 and rearward linkage 225. Forward linkage 220 is close to the front of sunroof 105 and when sunroof 105 is closed it is at the very forward end of track 205. Rearward linkage 225, when sunroof 105 is closed resides within track 205. In order to realize an unlimited opening potential, these embodiments provide channel 405 as one continuous guide channel in which both forward linkage 220 and rearward linkage 225 are guided inside. Channel 405 provides these linkages with appropriate mechanical support and guidance over the entire travel length of sunroof 105. These aspects are provided by the guide track design in combination with the design of rearward linkage 225 to initiate lifting when opening, and concluding lowering when closing, sunroof 105 with respect to opening 305.

Figure 5:
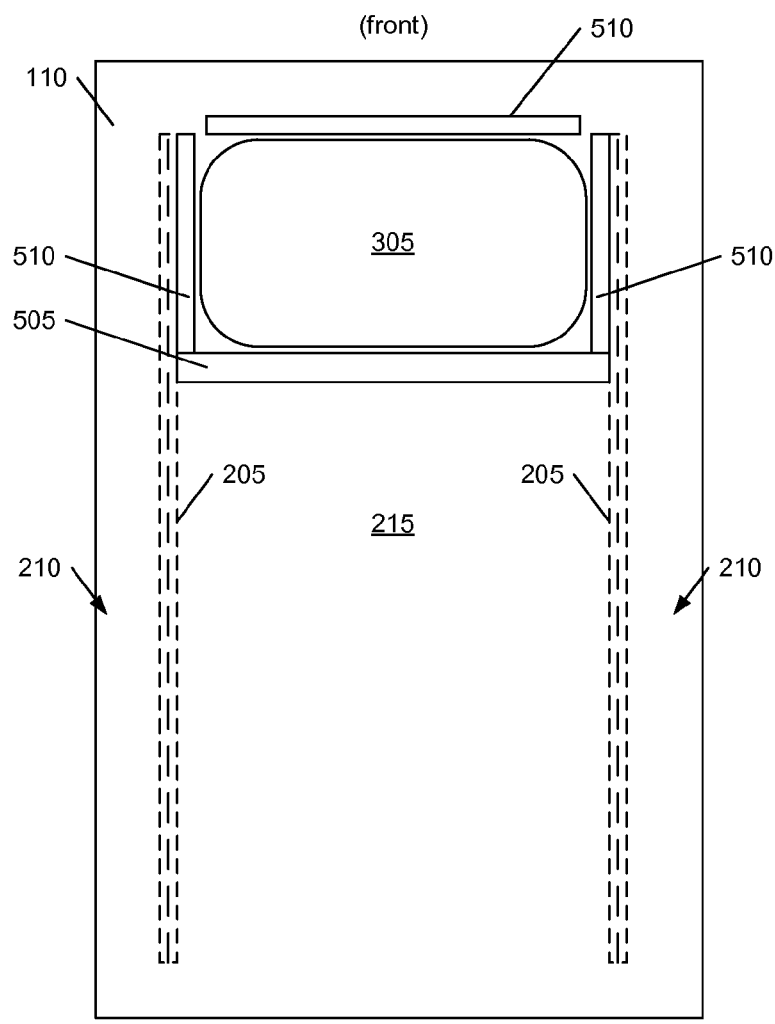
FIG. 5 illustrates the generic representation of FIG. 1 without top panels to reveal a structural cross-bow and sealing surfaces.

FIG. 5 illustrates the generic representation of FIG. 1 without sunroof 105 to reveal a structural cross bow 505 and a sealing surface 510. Cross bow 505 bridges a space of region 215 between tracks 205 without extending over either track 205. Cross bow 505 adds structural stability and strength, enhancing roof crush and side impact performance. Sealing surface 510 includes a compression seal cooperative with sunroof 105 when in the closed mode that provides environmental exclusion. While sealing surfaces are shown along lateral and edges, embodiments of the present invention may change, enhance, and/or remove some or all of the sealing surfaces to meet different performance and operational goals. Environmental components, such as wind noise and liquid elements (e.g., rain), are inhibited from entering opening 305 when sunroof 105 is closed and sealed. This arrangement of cross bow 505 and sealing surface 510 provides channel 405 and channel 410 of track 205 partly/entirely outside of the primary wind/water sealing system of roof portion 110. This, in turn, enables fore/aft travel of sunroof 105 to be limited only by vehicle architecture.

Various embodiments of the present invention have increased performance and operation of sunroof 105 by use of thinner, lighter weight materials than conventional sunroof materials. These materials include various plastics, polymers, and the like are not only thinner and lighter (and may be enhanced with ultraviolet shielding and other environmental protections, but because of the enablement of larger-sized openings, produce a larger-sized sunroof. In some cases, the larger size and the lighter/thinner material can introduce a design issue as sunroof 105 may negatively impact vehicle noise, vibration, and harshness (NVH). Embodiments of the present invention may include a latching system incorporated into sunroof 105 and cross bow 505 (e.g., a "hook" on a rearward edge of sunroof 105 for selective engagement with/disengagement from a complementary "latch" on a midpoint location of cross bow 505). The latching system helps to reduce NVH factors by securing the trailing edge of sunroof 105 and enhancing any environmental sealing as well. The latching/unlatching is preferably automatic with closing/opening, respectively, sunroof 105.

Preferably a mechanical/electromechanical system is coupled to the linkage mechanisms in order to move them. Movement of the linkage mechanisms operates sunroof 105 to move it between the closed mode and the opened mode. The mechanical/electromechanical system may be motorized or manually operated.

The following discussion details more specifically a preferred arrangement for lifting sunroof 105 as it moves rearward to open and for lowering sunroof 105 as it moves forward to close. Preferably, the forward and rearward mechanism linkages that couple one side of sunroof 105 to a particular guide track are both contained within one continuous track, and more specifically, within one channel of one continuous track. The forward linkage uses the channel to outside of the central vertical guide rib in the track for its path. The rearward linkage uses the both the inside and outside channels for its path. The inward channel from the vertical guide rib which the rearward linkage uses includes a lifting cam at it most forward position of the mechanism travel. Thus the outboard channel is left continuous which allows for the unlimited travel path within one extruded track part (i.e. no inner and outer tracks). This provides the necessary lifting and lowering of the rear edge of sunroof 105. The forward edge must be lifted and lowered as well. While a conventional solution would install a discrete cam block or other camming surface into the guide tracks, such implementations have drawbacks as noted above. The following discussion describes a preferred implementation of lifting and lowering the forward edge of sunroof 105. In this way, the forward edge and the rearward edges are controlled by their respective interactions with specific camming surfaces.

Figure 6:
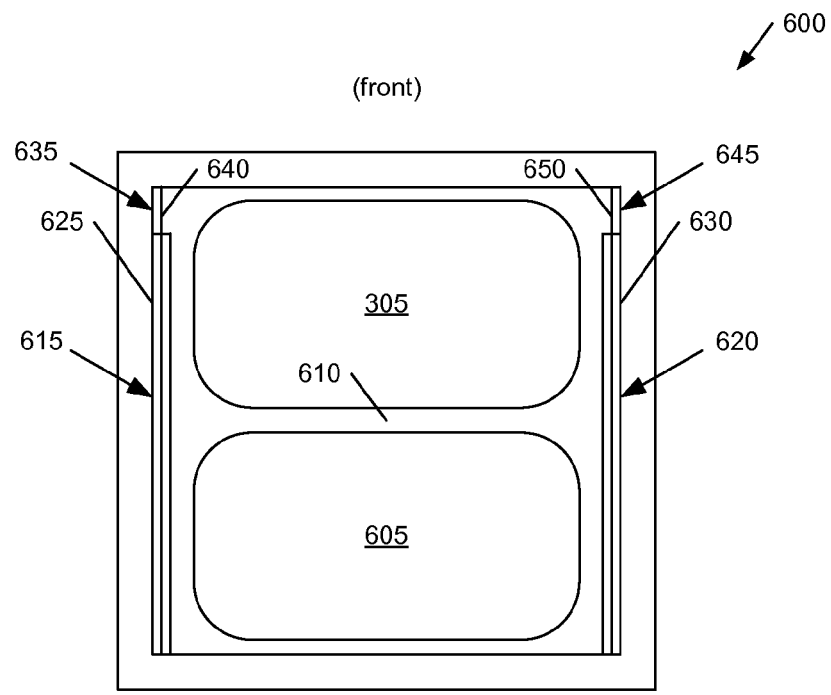
FIG. 6 illustrates a moveable panel frame assembly for installation into the roof portion.

FIG. 6 illustrates a moveable panel framework 600 for installation into roof portion 110. Framework 600 defines front compartment opening 305 and an optional rear compartment opening 605. A fixed panel (e.g., a transparent or semi-transparent panel) may be installed over rear compartment opening to provide a further enhanced feeling of openness in the passenger compartment. A structural cross bow 610 extends from a left lateral wall 615 of framework 600 to a right lateral wall 620. A left lateral guide track 625 is installed on left lateral vertical wall 615 and a right lateral guide track 630 is installed on right lateral vertical wall 620. Track 625 and track 630 are each an embodiment of sunroof track 205, each track including a pair of guide channels (e.g., an outer channel and an inner channel). In actual implementations, it may not be the case that the lateral walls are exactly vertical or that a base wall extending between the lateral walls is completely horizontal. The particular shape will be influenced by the roof shape and aerodynamics and may be sloped and/or curved. The base wall generally matches a contour of the roof portion into which framework 600 is installed.

As noted above, sunroof 105 includes mechanical linkages that engage the guide channels of track 625 and track 630. As sunroof 105 moves fore and aft along these tracks, camming structures lift and lower its forward and rearward edges to control the overall elevation and orientation (e.g., it is possible to control any desired tilt of sunroof 105 by independently adjusting the forward edge and the rearward edge).

A forward portion 635 of wall 615 defines an integrated forward-left cam structure 640 and a forward portion 645 of wall 620 defines an integrated forward-right cam structure 650. The cam structures provide cam slots directly into framework 600 that interact with the forward mechanical linkages of sunroof 105. Each cam slot includes a rear opening allowing a portion of the forward mechanical linkage to enter and exit according to operation of sunroof 105. A particular one of the channels of left track 625 includes a forward opening that is aligned with and mated to the rear opening of the cam slot provided in forward-left cam structure 640. Similarly, one of the channels of right track 630 includes a forward opening that is aligned with and mated to the rear opening of the cam slot provided in forward-right cam structure 650. In this way, the forward mechanical linkages enter the respective forward openings of the particular channel of track 625 and track 630 when they exit from the cam slots of the cam structures and they enter the cam slots when exiting from the forward openings of the particular channels. As noted above, it is preferred that the forward mechanical linkages operate in the outer channel, thus the forward openings are provided in the outer tracks in such an embodiment. Track 625 and track 630 are installed into framework 600 with sufficient tolerances that the forward openings are sufficiently close and aligned that the mechanical linkage accurately and smoothly transitions between the tracks and the cam structures without binding, catching, or other mechanical interference modalities.

Preferably the forward portions are manufactured for increased reliability and reduced complexity. There are a variety of ways to form the cam slots. For example, some embodiments provide injected molded forward portions and the injection molding process injection molds the cam slots. In other embodiments, the slots may be machined, die cast, stamped, or otherwise formed with/integrated into the forward portions.

Figure 7:
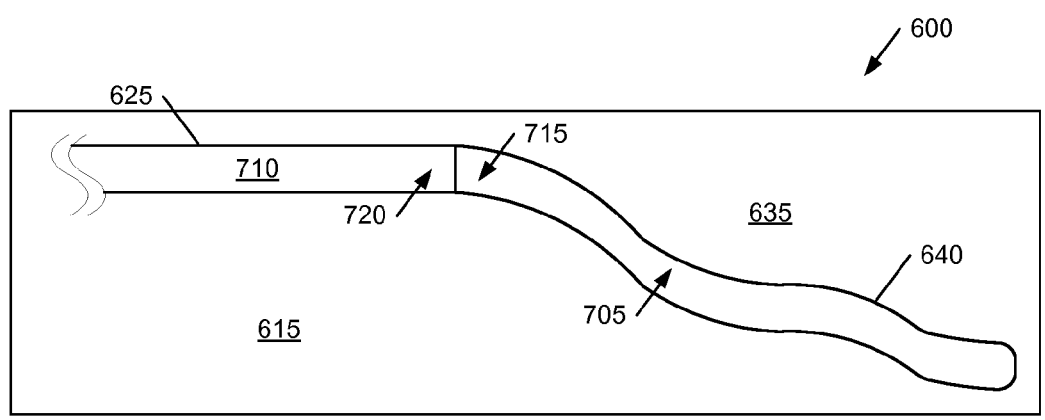
FIG. 7 illustrates a side view of a front left portion of the moveable panel frame assembly of FIG. 6.

FIG. 7 illustrates a side view of front left portion 635 of framework 600 of FIG. 6. Illustrated in FIG. 7 are a representative cam slot 705 in forward-left cam structure 640 and an outer channel 710 of left lateral track 625. Slot 705 includes a rear opening 715 and channel 710 includes a forward opening 720. Track 625 is installed on wall 615 to provide a continuous path for the forward left mechanical linkage of sunroof 105 that extends without mechanical interruption from channel 710 to slot 705. The actual contours of slot 705 are determined by the lifting/lowering (including unsealing/sealing) profile that is required or desired for the forward edge of sunroof 105 in relation to the rear edge and to framework 600 during sunroof 105 opening/closing.

Figure 8:
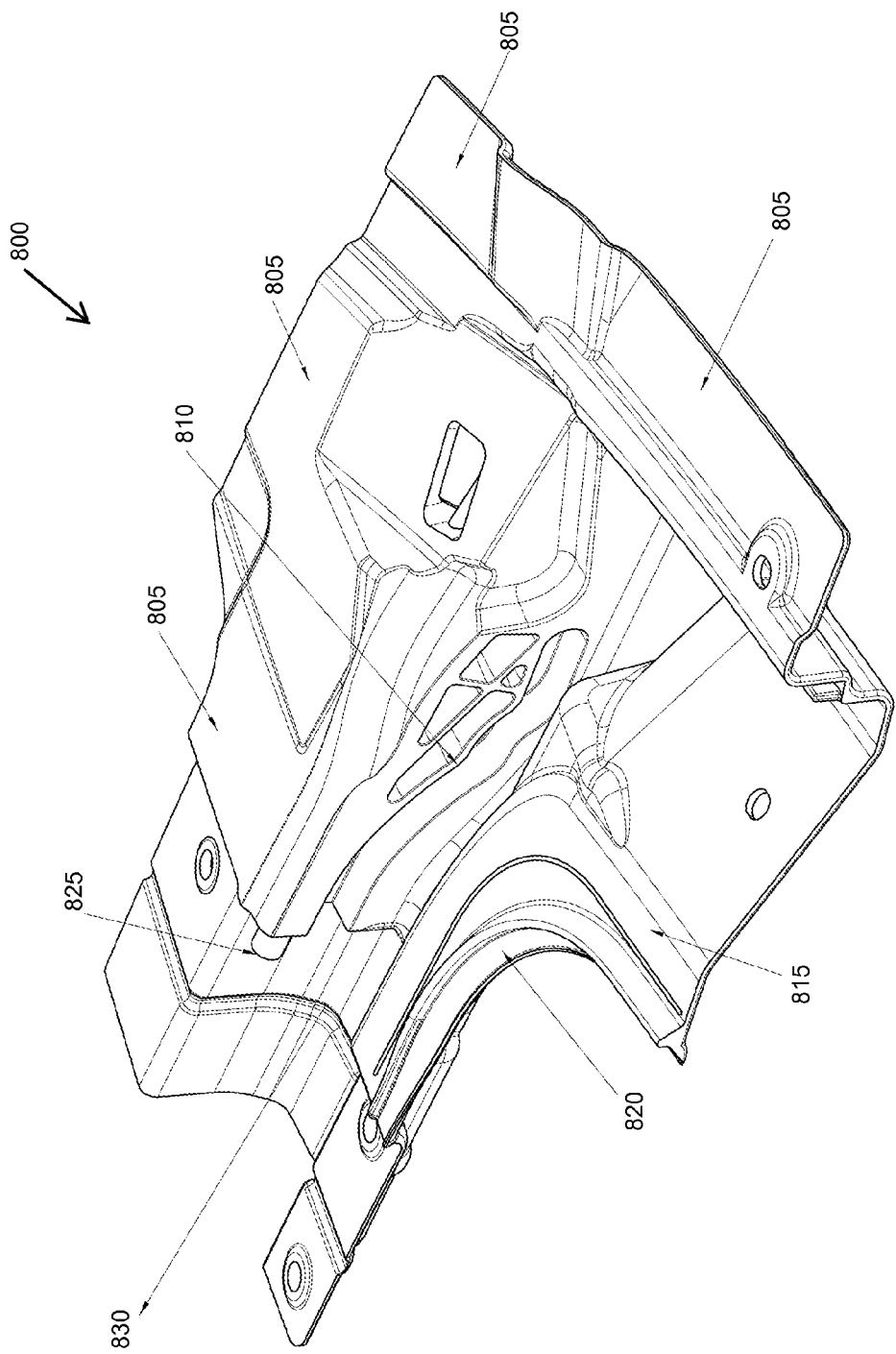
FIG. 8 illustrates an isometric view of a representative detail section of a framework of a top front left portion of the framework of FIG. 6.
Figure 9:
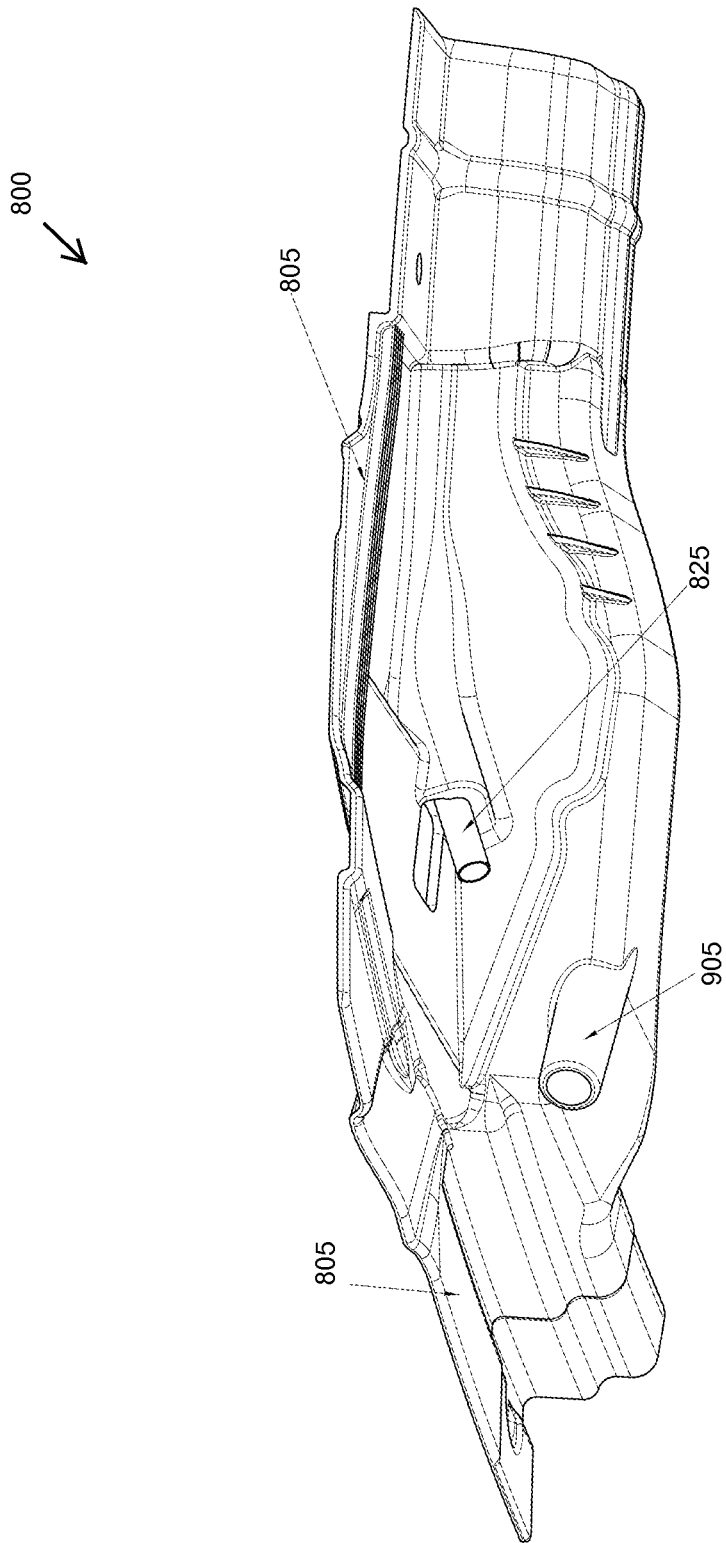
FIG. 9 illustrates an isometric view of a representative detail section of the framework of a bottom front left portion of the framework of FIG. 6.

FIG. 8 illustrates an isometric top view of a representative detail section of a framework of a front left portion 800 of the framework of FIG. 6; and FIG. 9 illustrates an isometric bottom view of front left portion 800. A "housing-less" framework offers cost savings and simplicity in assembly manufacturing of a roof system of a vehicle. Features and structures are integrated into the final formed (e.g., molded) framework that previously would require additional parts, manufacturing steps, and could negatively impact long term reliability as parts become loose or missing, not to mention potential degradations due to mismatched surfaces including excessive stresses and wear-and-tear. Portion 800 includes a number of integrated surfaces and features, including an integrated mounting surface 805 for mating to vehicle body; an integrated cam surface 810 for lifting/lowering sunroof 105; an integrated mounting surface 815 for primary compression seal (sealing sunroof 105 to exterior environment when sunroof 105 is closed); an integrated mounting surface 820 for anti-pinch protection (e.g., obstruction detection sensor and the like); an integrated drive tube 825 (a tube that guides a drive cable into guide track 205); and an integrated set of pocket and grooves 830 to around guide track 205 (grooves receive sealant to prevent water leaks). Further, FIG. 9 illustrates an integrated drain nozzle 905 for water management. Different implementations may have more or fewer integrated surfaces and/or components.

Preferably a mechanical/electromechanical system is coupled to the linkage mechanisms in order to move them which in turn operates sunroof 105 and moves it between the closed mode and the opened mode. The mechanical/electromechanical system may be motorized or manually operated.

Figure 10:
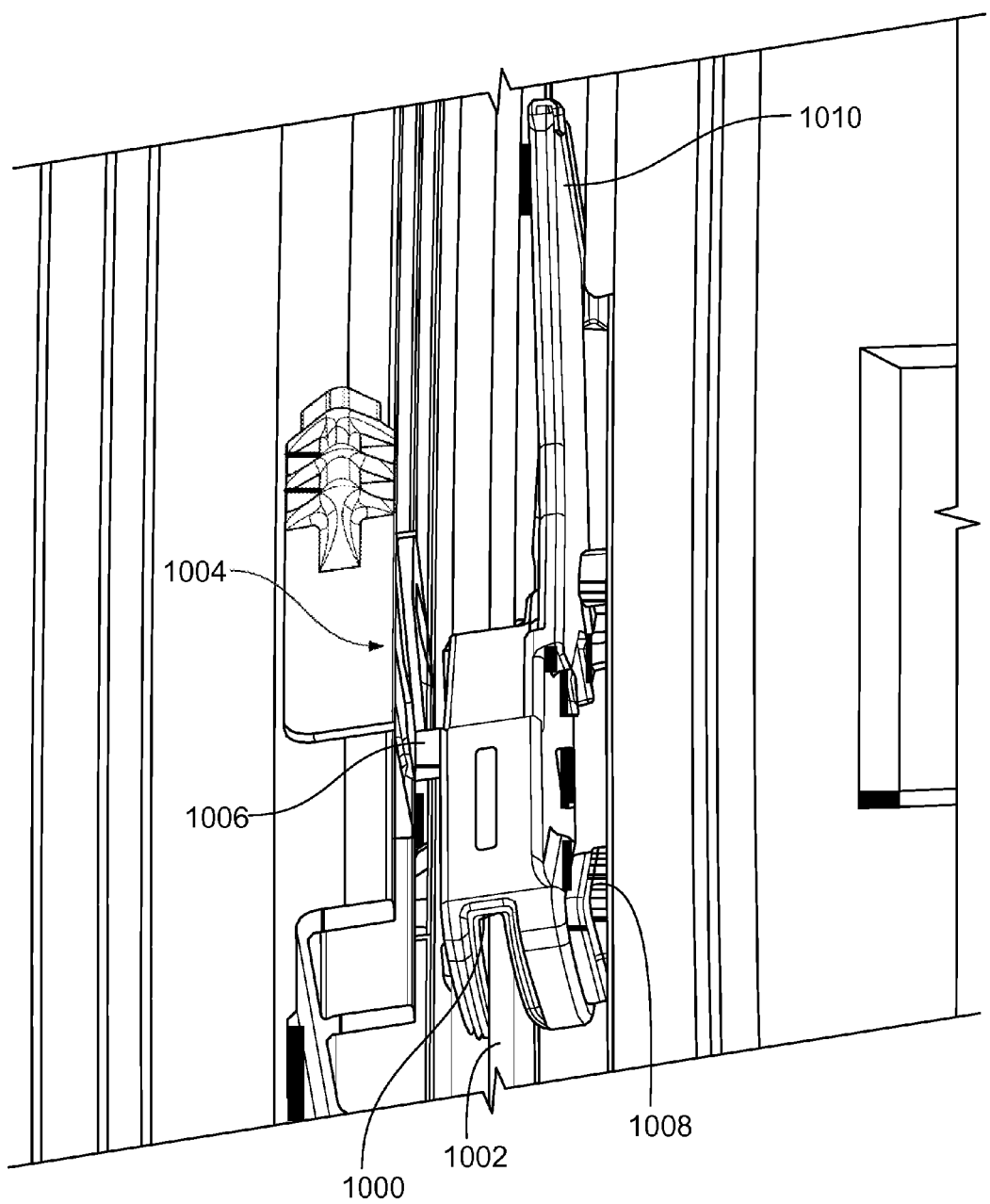
FIG. 10 illustrates the rear mechanism linkage in the movable panel closed position.

Referring now to FIG. 10, the rear mechanism linkages include a guiding channel which captures the mechanism side to side as the surfaces of the guide channel slide against and over a vertical guide rib coming off of the guide track. Particularly, the rear mechanism linkage includes a guide slot 1000 that slides against a vertical guide rib 1002 on the guide track and provides lateral support.

In order to have a continuous travel path for both mechanisms from the very front to the very rear, it is necessary to not have the actuating element of the rear mechanism linkage in the way. The rear mechanism linkage has a lift actuating element (cam) 1004. The lift actuating element (cam) 1004 is to one side of the vertical guide rib 1002 such that there is a continuous path from the front to the rear on the other side of the vertical guide rib. In this example, the lift actuating element (cam) 1004 is located in the inside channel on the driver side of the vehicle. The rear mechanism linkage has a guide pin 1006 that interfaces inside the lift actuating element (cam) 1004.

Moreover, the rear mechanism linkage has a guide pin 1008 that interfaces with a continuous front to rear guide channel in the guide track. The rear mechanism linkage has an attachment point 1010 where the moveable panel is attached to the rear mechanism linkage.

Figure 11:
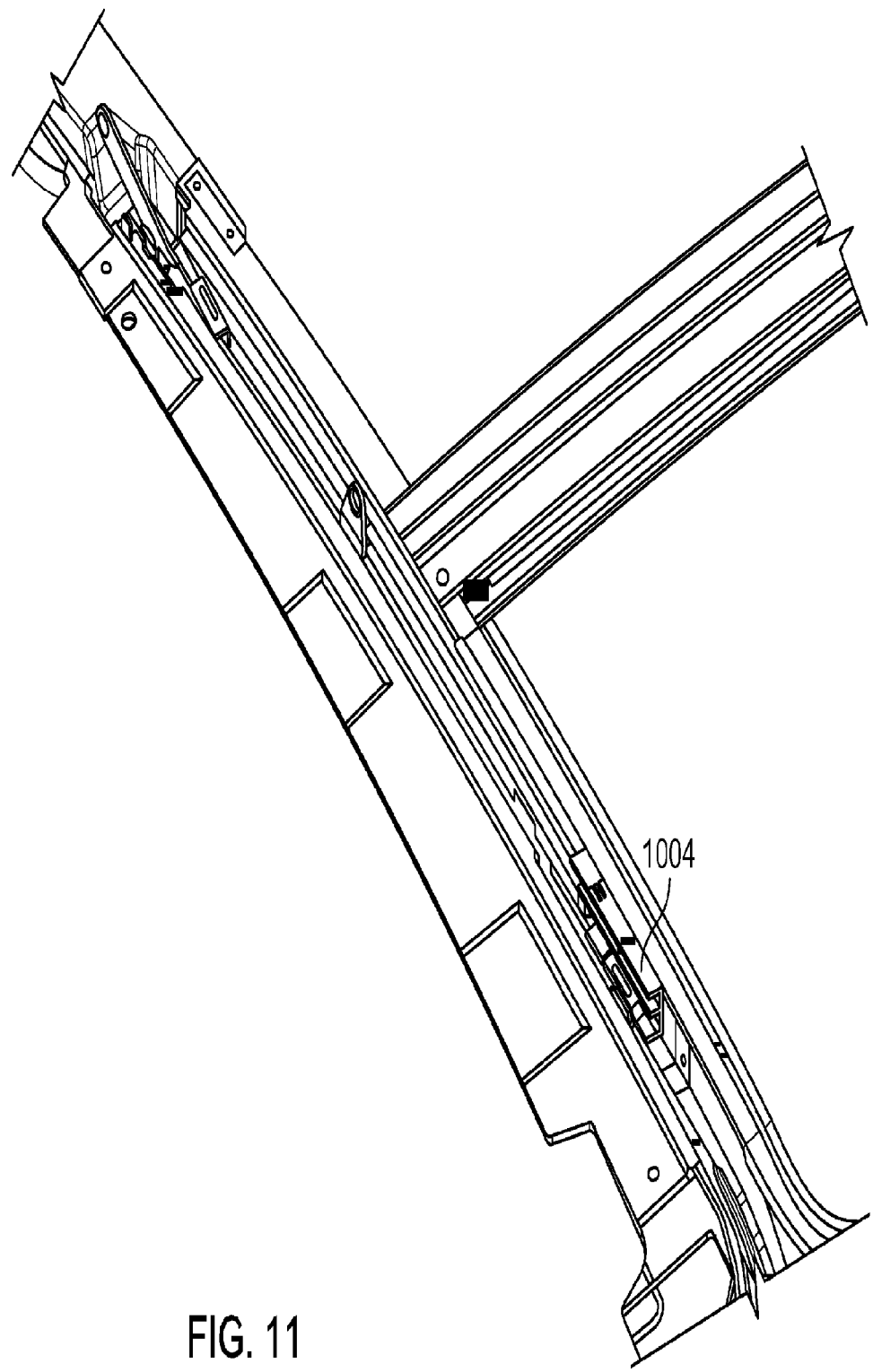
FIG. 11 provides a perspective view of a portion of a sunroof guide track and a structural cross bow.

Referring now to FIG. 11, it provides a perspective view of a portion of a sunroof guide track and a structural cross bow. The lift actuating element (cam) 1004 is visible. In this example, the lift actuating element (cam) 1004 is located in the inside channel on the passenger side of the vehicle.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A moveable panel system for a roof of a passenger compartment of a vehicle, comprising:
a left lateral track including a left outer guiding channel and a left inner guiding channel, said left outer guiding channel including a left forward opening;
a right lateral track including a right outer guiding channel and a right inner guiding channel, said right outer guiding channel including a right forward opening;
a moveable panel having a panel perimeter including a front edge, a back edge, a left edge, and a right edge;
a left forward mechanical linkage coupled to a forward portion of said left edge and moveably engaged with said left outer guiding channel;
a right forward mechanical linkage coupled to a forward portion of said right edge and moveably engaged with said right outer guiding channel;
a left rearward mechanical linkage coupled to a rearward portion of said left edge behind said left forward mechanical linkage and moveably engaged with said left outer guiding channel;
a right rearward mechanical linkage coupled to a rearward portion of said right edge behind said right forward mechanical linkage and moveably engaged with said right outer guiding channel; and
a structure disposed in the roof, said structure including:
a support including:
a left lateral generally vertical sidewall having a forward left portion defining an integrated left cam slot configured to accept said left forward mechanical linkage, said integrated left cam slot including a left rear opening;
a right lateral generally vertical sidewall having a forward right portion defining an integrated right cam slot configured to accept said right forward mechanical linkage, said integrated right cam slot including a right rear opening;
a generally horizontal base wall extending between said sidewalls and defining a passenger compartment opening having an opening perimeter smaller than said panel perimeter;
a left track mounting region defined at said left sidewall mounting said left lateral track to said left sidewall while juxtaposing said left forward opening with said left rear opening; and
a right track mounting region defined at said right sidewall mounting said right lateral track to said right sidewall while juxtaposing said right forward opening with said right rear opening;
wherein said left outer guiding channel guides said left linkages as said moveable panel moves forward and aft over said base wall;
wherein said right outer guiding channel guides said right linkages as said moveable panel moves forward and aft over said base wall; and
wherein said cam slots define a lift/lower profile for said front edge of said moveable panel as said moveable panel lifts and lowers with respect to said passenger compartment opening responsive to said forward linkages moving within said cam slots.

2. The moveable panel system of claim 1 wherein said forward portions each include an injection molded plastic portion with each said integrated cam slot molded directly into said injection molded plastic portion.

3. The moveable panel system of claim 1 wherein said integrated cam slots are machined into said forward portions.

4. The moveable panel system of claim 1 wherein said integrated cam slots are die casted into said forward portions.

5. The moveable panel system of claim 1 wherein said integrated cam slots are stamped into said forward portions.

6. The moveable panel system of claim 1 wherein:
said support includes a plurality of integrated surfaces formed to support a plurality of kinematic functions associated with installation and operation of the moveable panel.

7. The moveable panel system of claim 1 further comprising a left rear camming surface disposed within said left inner guiding channel and a right rear camming surface disposed within said right inner guiding channel, wherein said rearward mechanical linkages are moveably coupled to said inner guiding channels and responsive to said rear camming surfaces to define a lift/lower profile for said rear edge of said moveable panel as said moveable panel lifts and lowers with respect to said passenger compartment opening responsive to said rear linkages moving in said inner channels with respect to said rear camming surfaces.

8. The moveable panel system of claim 6 wherein said plurality of kinematic functions includes water management and a particular one integrated surface of said plurality of integrated surfaces includes an integrated drain nozzle.

9. The moveable panel system of claim 6 wherein said plurality of kinematic functions includes mating to a body of the vehicle and a particular one integrated surface of said plurality of integrated surfaces includes an integrated body mounting surface.

10. The moveable panel system of claim 6 wherein said plurality of kinematic functions includes elevation/tilt profile control of the moveable panel and a particular one integrated surface of said plurality of integrated surfaces includes an integrated cam surface.

11. The moveable panel system of claim 6 wherein said plurality of kinematic functions includes environmental seal protecting the passenger compartment from weather ingress and a particular one integrated surface of said plurality of integrated surfaces includes an integrated mounting surface for a compression seal.

12. The moveable panel system of claim 6 wherein said plurality of kinematic functions includes obstruction control limiting closing motion of the moveable panel and a particular one integrated surface of said plurality of integrated surfaces includes an integrated mounting surface for anti-pinch protection.

13. The moveable panel system of claim 6 wherein said plurality of kinematic functions includes fore/aft position control of the moveable panel and a particular one integrated surface of said plurality of integrated surfaces includes an integrated drive tube for guiding a flexible drive cable into said track.

14. The moveable panel system of claim 6 wherein said plurality of kinematic functions includes leak control and a particular one integrated surface of said plurality of integrated surfaces includes an integrated surface having a plurality of pockets and grooves configured to retain sealant inhibiting a water leak at a juncture of said track and said support.

* * * * *

UNITED STATES PATENT AND TRADEMARK OFFICE
CERTIFICATE OF CORRECTION

PATENT NO. : 8,807,642 B2  
APPLICATION NO. : 13/629169  
DATED : August 19, 2014  
INVENTOR(S) : Gruss et al.

It is certified that error appears in the above-identified patent and that said Letters Patent is hereby corrected as shown below:

On the title page item 72 at the end of the Inventors list add: Mitchell Stephens, Lexington, Kentucky (US)

Signed and Sealed this
Sixteenth Day of February, 2016

Michelle K. Lee
*Director of the United States Patent and Trademark Office*